United States Patent [19]
Walsh et al.

[11] Patent Number: 6,001,188
[45] Date of Patent: Dec. 14, 1999

[54] SUBSTITUTED PYRROLIDONE PLASTICIZED THERMOPLASTIC RESIN USEFUL AS A PLASTIC PROCESSING EQUIPMENT CLEANING COMPOUND

[75] Inventors: William C. Walsh, Archbold, Ohio; Tom A. Hazenstab, Huron Twp.; Mark W. Waldrop, Royal Oaks, both of Mich.

[73] Assignee: BASF Corporation, Mt. Olive, N.J.

[21] Appl. No.: 09/034,608

[22] Filed: Mar. 3, 1998

Related U.S. Application Data

[63] Continuation-in-part of application No. 08/637,978, Apr. 26, 1996, abandoned.

[51] Int. Cl.$^6$ ............................................. C11D 7/32
[52] U.S. Cl. .................................. 134/7; 134/8; 134/22.19; 428/402.21; 428/402.22
[58] Field of Search .............................. 264/4.1, 4.3, 4.33, 264/4.6; 134/22.19, 8; 428/402.21, 402.22

[56] References Cited

U.S. PATENT DOCUMENTS 5,594,035  1/1997  Walsh ........................................ 521/47

*Primary Examiner*—Jeffrey C. Mullis
*Attorney, Agent, or Firm*—Joanne P. Will; Mark A. Frentrup

[57] ABSTRACT

This invention relates to a plastics processing equipment cleaning compound comprising a hard outer shell made from a thermoplastic resin and a soft inner core containing a substituted pyrrolidone.

11 Claims, 1 Drawing Sheet

SUBSTITUTED PYRROLIDONE PLASTICIZED THERMOPLASTIC RESIN USEFUL AS A PLASTIC PROCESSING EQUIPMENT CLEANING COMPOUND

This is a continuation in part of application Ser. No. 08/637,978, filed Apr. 26, 1996, now abandoned.

FIELD OF THE INVENTION

The present invention relates to a plastics processing equipment cleaning compound comprising a hard outer shell made from a thermoplastic resin and a soft inner core containing a substituted pyrrolidone.

BACKGROUND OF THE INVENTION

The thermoplastic resin industry processes approximately 7.75 million tons of thermoplastic resin per year. The machinery used to process these resins, injection molding machines and extruders, are subject to substantial wear and tear.

Specifically, injection molding machines and extruders operate at high temperatures, and usually, at some point during the resin processing cycle, under high pressures. In the injection molding process, the plastics are either melted into a viscous liquid, or softened to a putty like solid, and are forced, with pressure, into the mold. The mold is then usually allowed to cool, and the resin re-solidifies, only now the resin pellets are a solid mass the shape of the mold.

Extruders consist of a tube, or barrel, that contains an auger, or screw device. The barrel is heated, so that as the plastic pellets travel down the tube, through the action of the screw, they soften into a very flowable putty which exits the barrel through an opening that is the shape of the final product being produced. As the softened plastic exits the barrel, into the open air, the extruded shape instantly hardens.

When organic molecules are subjected to the temperatures (300°–500° F.) and pressures (up to several tons per square inch) associated with the extrusion and molding processes, there is some tendency for degradation of the molecules to occur. Although antioxidants and heat stabilizers are usually added to the plastics, small amounts of the plastic degrade and the residue particles plate out onto the surfaces of the feed lines and mold surfaces of injection molding machines, and onto the screw and barrel surfaces of extruders. Over time, the residue gradually builds up into a baked on blackish-brown film. The film eventually grows to a thickness where it begins to either interfere with the process causing deformation of parts or extrusions, or flakes off into the hot liquid or putty like plastics, and becomes a surface defect. When the carbon black film builds up to this critical thickness, where it becomes a major quality problem, the processing equipment has to be cleaned.

Other occasions that facilitate the cleaning of plastics processing equipment are when either a resin color change is made or when a resin with compounded ingredients and fillers, follows in a production run, a resin that contains different fillers or additives that should not be intermixed with the new resin system. A thorough cleaning of the injection molding machine or extruder is required, for both of these cases, before the next production run can begin.

Currently, a number of methods are employed to clean plastics processing equipment. One method is to disassemble the injection molding machine or extruder, and have the metal parts submerged into a hot caustic bath. Usually these baths contain some surfactants also. The caustic, over time, breaks up the carbon black build up. This cleaning process is the least desirable, of the potential cleaning methods, as the time involved with disassembling, dip cleaning, and re-assembling the equipment adds up to substantial loss of production time. Also, there are serious safety considerations whenever hot caustic baths are employed.

Another cleaning method employed, usually when color changes or compound changes occur, is to simply run the mold or extruder through multiple cycles using the new color or compound. The cycle is repeated with the new compound until parts are made or extrusion occurs which are free from the previous color or filler additives. The drawback of this cleaning alternative, is that the generation of large amounts of scrap can occur. Often times this scrap cannot be chopped up or re-ground for re-use, and ends up being landfilled.

Cleaning of extruders or injection molding machines, is also accomplished with specialty formulated resin based "cleaning compounds." These cleaning compounds are solid thermoplastic resins that contain surface active agents, abrasive fillers (usually glass or finely chopped fiberglass), and sometimes an amine compound such as monoethanolamine. The cleaning resins are put into the plastics processing equipment in the same manner as compound resins for making production parts. The equipment is operated as if normal production is occurring, except that: (a) the equipment is operated at a slower rate, and (b) the equipment is occasionally shut down. The slower operating rate allows for the abrasive fillers to "grind" away at any hardened build-up of carbon, and the occasional stopping of the equipment gives the monoethanolamine a chance to work at dissolving carbon build-up. Carbon deposits are normally susceptible to alkaline or basic agents, such as monoethanolamine. Cleaning compositions are disclosed in U.S. Pat. Nos. 5,139,694; 5,443,768; 5,427,623; 5,397,498; 5,395,456; 5,298,078; 5,238,608; 5,236,514; 5,124,383; 5,108,645; 5,087,653; and 4,838,945. Specifically, Itoh (U.S. Pat. No. 5,298,078) teaches the melting of polystyrene and polyethylene and addition of alkaline salts and glass fibers as cleaning ingredients. Kmiec (U.S. Pat. No. 5,139,694) and Obama (U.S. Pat. No. 5,124,383) teach the melting of polyethylene resin (substituted pyrrolidones are not soluble in polyethylene or polypropylene) and then adding in abrasive inorganic fillers and polyethylene waxes and fatty acid amide waxes. Abrams (U.S. Pat. No. 5,395,456) teaches the melting of polymers and inclusion of calcium carbonate abrasive, and rosins as cleaning ingredients.

Scheilbelhoffer (U.S. Pat. No. 5,443,768) and Obama (U.S. Pat. No. 5,108,645) both disclose the melting of polymers and the inclusion of hard methacrylate and acrylate compounds as cleaning media. Also, Ishida (U.S. Pat. No. 5,397,498) discloses the melting of a thermoplastic and inclusion of polyalkylene oxide based polyol cleaning agents.

An alternative method for making an extruder cleaning compound, is taught by Schumann (U.S. Pat. No. 5,427,623)(U.S. '623). U.S. '623 teaches a method for making an Acrylonitrile Butadiene Styrene (ABS) powder (or resin) cleaning compound which contains water. The ABS cleaning resin is produced by taking an ABS emulsion and separating the ABS polymer from the emulsion by adding an ionic salt to the emulsion, in large enough quantities to cause the emulsion to break.

A major drawback to these cleaning compounds is that the resins themselves tend to be abrasive in nature. Acrylate based resins that require high temperatures for melting, to flow state, are normally used, and can be very abrasive on the metal surfaces of the equipment. This extra wear on the surface can detract from the useful life of the equipment. Another drawback of some of these cleaning resins is that they contain monoethanolamine which has a high degree of toxicity associated with it. During that portion of the cleaning cycle when the processing equipment is shut down, large quantities of the amine compound vapors are emitted from the hot machines.

An improvement in the art of cleaning plastics processing equipment is needed. The process should not require the disassembling of equipment to accomplish proper cleaning, and should not require the use of highly alkaline compounds or abrasive resins.

The present invention is just such an improvement in the art. Applicants have surprisingly discovered a novel plastics processing equipment cleaning compound comprising a bead or pellet having a hard thermoplastic resin outer core and a soft inner core containing alkyl or alkoxy substituted pyrrolidones. Applicants' novel cleaning compound is added directly into extruders and injection molding machines in the same way that resins are fed during routine production, eliminating the need for disassembling the machines. As the cleaning compound is melted and forced through an extruder or injection molding machine's interior, it softens and removes carbon build up and hardened resins from the surfaces of the machine's barrel and screw.

DEFINITION AND USAGES OF TERMS

The term "low temperature flow resin" as used herein, refers to resins that have to attain a temperature of between 400°–500° F. before they become liquid enough to flow into a mold or out the end of an extruder. Such resins are represented by polyvinylchloride, polystyrene and acrylonitrile/butadiene/styrene (ABS) resins.

The term "high temperature flow resin" as used herein, refers to resins that have to attain a temperature of between 500°–600° F. before they become liquid enough to flow into a mold or out the end of an extruder. Such resins are represented by polycarbonate and nylon resins.

The term "thermoplastic resin/substituted pyrrolidone solution" as used herein, refers to the solution which results when the thermoplastic resin is blended with the substituted pyrrolidone solvent. Said solution is used to make the novel cleaning compound.

The term "extruders" (heated barrel and screw constructions) refer to the mechanisms to simultaneously melt and feed the plastic from an injection molding machine into a mold or through the die head of an extruder.

The term "bead" or "pellet" can be used interchangably to refer to the shape of the cleaning compound of the present invention.

SUMMARY

Figure 1:
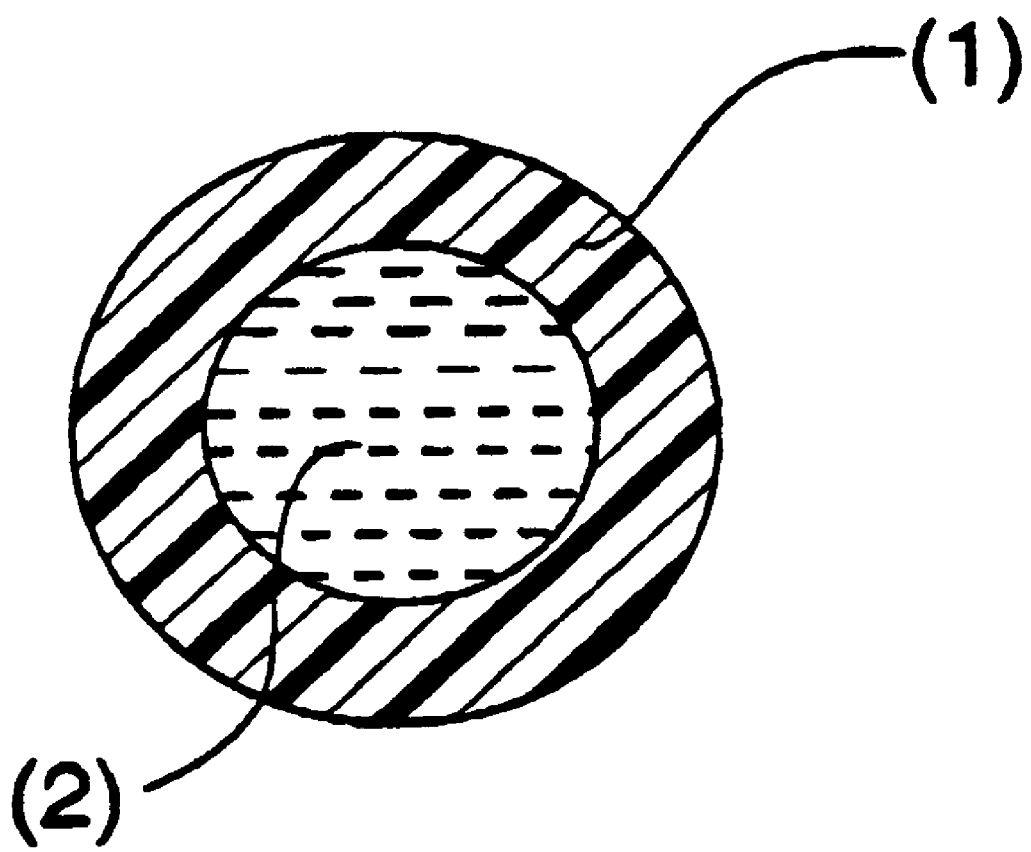
FIG. 1—illustrates a pellet of applicants' invention having a hard outer resin core (1) and a soft substituted pyrollidone inner core (2).

The present invention relates to a plastics processing equipment cleaning compound comprising a hard outer shell made from a thermoplastic resin and a soft inner core comprising a substituted pyrrolidone.

DETAILED DESCRIPTION

The present invention relates to a plastics processing equipment cleaning compound comprising a hard outer shell made from a thermoplastic resin and a soft inner core comprising a substituted pyrrolidone.

Further, the present invention relates to a method of cleaning plastic processing equipment comprising contacting said equipment with a cleaning compound comprising a hard outer shell made from a thermoplastic resin and a soft inner core comprising a substituted pyrrolidone.

Specifically, the Applicants' plastics processing equipment cleaning compound is a bilayer wherein the outer shell is a hard thermoplastic resin and the soft inner core is a substituted pyrollidone. The substituted pyrrolidone is trapped within the hard thermoplastic resin. Said bilayer structure can be pellet (i.e. bead) shaped. When said pellet is extruded through plastics processing equipment, the soft substituted pyrollidone is released from the inner core of the pellet to clean the interior of equipment. Further, the soft inner core can be liquid or gel like in character. However, a gel like consistency is preferred. The more liquid the soft inner core, the more pure substituted pyrrolidone is present. The more gel like the soft inner core, the more the substituted pyrrolidone has become mixed with the thermoplastic resin to create a soft gel like material.

Clearly, the unique feature of the Applicants invention is its bilayer structure. If one cuts the pellet in half, the hard outer resin core (1) is distinct from the soft inner core which contains the substituted pyrollidone (2).

PREPARATION OF THE CLEANING COMPOUND OF THE PRESENT INVENTION

The cleaning compound of the present invention, preferably, takes the form of beads or pellets and is prepared as described herein:

The thermoplastic resin type useful for preparing the cleaning compound of the present invention can be either a low temperature flow resin (nonpolyolefin), or a high temperature flow resin system. As long as the thermoplastic resin can be solvated by a substituted pyrrolidone in a sufficient weight percent to allow for the manufacture of non-tacky cleaning pellets, it can be formulated into a cleaning compound. Thermoplastic resin systems that can be made into cleaning compounds include, but are not limited to, resins capable of being solvated by substituted pyrrolidones, such as acrylonitrile/butadiene/styrene (ABS), styrene acrylonitrile (SAN), polystyrene, acrylonitrile styrene acrylate (ASA), methacrylate acrylonitrile butadiene styrene (MABS), nylon, polycarbonate, thermoplastic urethane, polyvinylchloride (PVC), polyether imide, and polyacetal. Particularly preferred resins, useful in the practice of the present invention, are ABS and SAN.

The thermoplastic resin which will be formulated into the cleaning compound can either be virgin material purchased directly from a manufacturer or resin that has already been used (i.e., recycled resin pellets, or parts already made up from a resin that are cut up or shredded).

The substituted pyrrolidones useful for preparing the cleaning compound of the present invention include, but are not limited to, N-Cyclo Hexyl pyrrolidone, N-Methyl Pyrrolidone and N-Hydroxy Ethyl Pyrrolidone and mixtures thereof. Specifically, one substituted pyrrolidone or a blend of substituted pyrrolidones may be entrapped within the inner core of the bead.

Additives such as surface active agents, fumed silica, or glass/fiberglass and abrasive fillers can optionally be added to the substituted pyrrolidone plasticized thermoplastic resin.

I. Preparation of the Thermoplastic Resin/Substituted Pyrrolidone Solution

The first step in manufacturing the cleaning compound of the present invention involves the dissolving of the thermoplastic resin into the substituted pyrrolidone to form a thermoplastic resin/substituted pyrrolidone solution. Substituted pyrrolidones include, but are not limited to, alkyl or alkoxy substituted pyrrolidone, such as N-Cyclo Hexyl pyrrolidone, N-Methyl Pyrrolidone or N-Hydroxy Ethyl Pyrrolidone and mixtures thereof. N-Methyl Pyrrolidone is available from BASF Corporation, Mt. Olive, N.J., International Specialty Products, Wayne, N.J. and ARCO Chemical Co., Newtown Square, Pa. N-Hydroxy Ethyl Pyrrolidone is available from BASF Corporation and International Specialty Products. N-cyclohexyl pyrrolidone is preferred, N-hydroxyethyl pyrrolidone is more preferred, and N-methyl-pyrrolidone is most preferred.

The substituted pyrrolidone can be agitated with a high shear mixer, so that the thermoplastic resins can be dissolved into the solvent at a faster rate. The solvent may be heated, but it does not need to be. Temperature of the solvent should be between 20° C. and 150° C., preferably between 60° C. and 140° C. most preferred between 95° C. and 125° C.

The thermoplastic resin should be added to the substituted pyrrolidone solvent to form a thermoplastic resin/substituted pyrrolidone solution. Specifically, the thermoplastic resin should be about 1–50% by weight of the thermoplastic resin/substituted pyrrolidone solution, preferably from 10–40% by weight and most preferably from 20–40% by weight of the thermoplastic resin/substituted pyrrolidone solution.

Said thermoplastic resin/substituted pyrrolidone solution should be mixed at a fast speed (120 rpm) for a sufficient amount of time to allow for the thermoplastic resin particles to be totally dissolved. This time frame for mixing will vary depending on the resin type, temperature of the substituted pyrrolidone, and the total weight % of the thermoplastic resin added. Generally, mixing time is in the range of several hours in duration.

If any other additives or ingredients, such as surfactants or abrasives, are to be added to the formulation, they can be added into the solvent during the mixing phase.

II. Preparation of the Cleaning Compound of the Present Invention from the Thermoplastic Resin/Substituted Pyrrolidone Solution Formed in Step (I.)

Next the thermoplastic resin/substituted pyrrolidone solution is added to the water by either dripping (titrating) or forcing (extruding) a constant stream out of a fixed diameter opening. The dripping action forms individual beads or pellets upon contact with the water, the constant stream extrusion forms a cylindrical shaped solid the length of which is determined by the duration that the forcing action is applied to the opening.

The water into which the thermoplastic resin/substituted pyrrolidone solution is added can be either local tap water or deionized water. The water may or may not contain a wetting agent or surface tension depressing compound. If well defined bead size is desired, and the thermoplastic resin solids content in the substituted pyrrolidone solvent is low (around 5–10%) then a surface active agent mustbe added to the water. The solid beads will form when thermoplastic resin/substituted pyrrolidone solution of 5–10% is added to water that does not contain surfactant, but no two beads may be the same shape. These odd shaped beads can still be used as functional cleaning compounds, but aesthetically they may not be appealing.

The water should be agitated at a low speed when the thermoplastic resin/substituted pyrrolidone solution is titirated or sprayed into it, or it should flow away from the opening from which the thermoplastic resin/substituted pyrrolidone solution is extruded. To produce beads, the water must be agitated at a slow speed as the thermoplastic resin/substituted pyrrolidone solution is titrated or sprayed into the the thermoplastic resin/substituted pyrrolidone solution is titrated or sprayed into the water. When a solid, fixed shape such as a rod or sheet is desired the thermoplastic resin/substituted pyrrolidone solution must be forced through a fixed sized opening (e.g., a die head) and added into a stream of water that flows away from the die head, at the same rate as, as the thermoplastic resin/substituted pyrrolidone solution. Once formed, said rods or sheets can be cut into beads.

The temperature of the water is not critical for the formation of solid fixed shapes, regardless of whether the shapes are beads, rods or sheets. Thermoplastic resin/substituted pyrrolidone solutions coming into contact with water that is 1° C. will give rise to solid fixedshapes, such as beads, as will thermoplastic resin/substituted pyrrolidone solutions coming into contact with steam. The substituted pyrrolidones are hygroscopic, and will pull water out of the air. The preferred range of water temperature would be from 20° C. up to approximately 70° C.

After the solid fixed shapes, preferably beads, are precipitated out in the water, the bead remains in the water for a given period of time. During this water soak process, some amount of the substituted pyrrolidone that became entrapped within the bead, is leached out of the resin. This soak time should be of sufficient duration to allow for an amount (80–99%) of the substituted pyrrolidone to leach from the bead so that after the thermoplastic resin is dried, its surface will be hard, not tacky or sticky.

The final product which results from the process described hereinabove is the non-tacky, bead shaped cleaning compound of the present invention wherein 2 to 17% by weight of substituted pyrrolidone is entrapped in the bead as the soft inner core (2) shown in FIG. 1. Preferably, 2–12% by weight of substituted pyrrolidone is entrapped within the bead, most preferably 2–10% by weight of substituted pyrrolidone is entrapped within the bead. Further, the hard resin exterior, (1) of FIG. 1, comprises 83–98% of the bead, preferably 88–98%, and most preferably 90–98% of the bead.

The substituted pyrrolidone in the soft inner core will ultimately do the cleaning inside the plastics processing equipment: When the beads are heated and begin to flow during the equipment cleaning process, they release the substituted pyrrolidone inside the equipment.

The duration of the water soak needed to make cleaning compound beads will vary depending on thermoplastic resin type, initial concentration of thermoplastic resin in the thermoplastic resin/substituted pyrrolidone solution, and water temperature. Typically the thermoplastic resin particles will soak in the water for 16–48 hours.

After the water soak cycle is completed, the beads are dried, likely by, but not necessarily, with forced hot air to remove any surface water, and dry out the water from the top layers of the thermoplastic resin particles surface, so hard non-tacky resin particles occur. The water has leached the substituted pyrrolidones out of these top layers of the surface of the beads. However, if the water that replaced the substituted pyrrolidones in these layers is not dried out of the beads, water will ooze out of the individual beads causing them to clump together, and stick to the sides of holding containers. The drying step pulls the water out of these layers and prevents the clumping from occurring.

There are several ways to determine if the beads, formed as described hereinabove, are ready for use as a cleaning compound: 1. visual inspection by cutting open several beads and observing the bilayer structure; 2. Gas chromatographic analysis wherein the bead is dissolved in tetrahydrofuran (THF) and the bead/THF sample is analyzed via gas chromatography for a thermoplastic resin peak and a substituted pyrrolidone peak.

Now the substituted pyrrolidone plasticized thermoplastic resin compound is ready to be used as a cleaning agent for the internal surfaces of plastics processing equipment.

The following non-limiting examples illustrate how to prepare the cleaning compositions of the present invention:

EXAMPLE 1

20.0 g of CYCOLAC® Resin (ABS resin) was dissolved into 180.0 g of N-Methyl Pyrrolidone (NMP). The NMP was in a 300.0 ml PYREX® beaker, which contained a 1 inch magnetic stirring bar. The resin was added to the beaker, and the beaker was placed onto a magnetic stirring apparatus. The stirring apparatus control was set at a medium setting. Mixing occurred for 8 hours in duration. The temperature of the NMP was 24° C.

Using an eyedropper, the NMP/CYCOLAC® solution was dripped into agitated water contained in a 2000 ml PYREX® beaker. The water was tap water, and was maintained at 24° C. Agitation was supplied by a 3 inch magnetic stirring bar and magnetic stirring apparatus. The water contained 0.3% (by weight) of a wetting agent PLURAFAC® RA-20. As each drop of NMP/CYCOLAC® solution touched the water, spherically shaped resin particles resulted.

The beads formed were approximately 0.25 inches in diameter. The resin spheres were allowed to soak in the water for 48 hours. The spheres were then dried in a forced air oven for 20 minutes at 80° C. After drying some of the "resin beads" were analyzed for inner core NMP content. This process yielded resin particles containing 3.1% (by weight) of NMP.

EXAMPLE 2

20.0 g of LURAN® (SAN Resin) was dissolved into 180.0 g NMP. This was done in an exact manner as was described in Example 1 above.

The resultant NMP/LURAN® solution was then dripped into a 2000 ml PYREX® beaker filled with tap water. The water was agitated in the same manner as is described in Example 1. The water was also at 24° C. This water did not contain any wetting agent.

Elliptically shaped resin particles were formed as the NMP/LURAN® resin solution came into contact with the water. The resin particles formed were approximately 0.25 inches in diameter. The resin particles were allowed to soak in the water for 48 hours after which they were dried in a forced air oven for 20 minutes at 80° C. After drying some of the resin beads were analyzed for inner core NMP content. This process yielded resin particles containing 7.4% (by weight) of NMP.

EXAMPLE 3

150.0 grams of NMP was added to a 300 ml PYREX® beaker which contained a one inch stirring magnet. The beaker and contents was placed onto a hot plate/magnetic stirring apparatus. The stirring mechanism was set at a medium speed, and the heating element was turned on. The NMP was heated up to 80° C., and maintained at that temp until resin blending was completed. To that hot NMP was added 50.0 grams of CYCOLAC® (ABS resin). The resin/NMP were allowed to mix for 6 hours.

An eye dropper was used to titrate the hot NMP/CYCOLAC® solution into a 2000 ml PYREX® beaker containing agitated tap water, at 24° C. Agitation was supplied by a 3 inch magnetic stirring bar. Stirring apparatus control was set at a medium/low setting. As the NMP/CYCOLAC® solution came in contact with the water, spherically shaped beads of resin were formed. These beads were allowed to soak in the water for 20 hours duration. The beads produced by the titration were approximately 0.25 inches in diameter (or 0.60 cm in diameter). The beads were removed from the water and laid out onto a paper towel, to air dry, in 24° C. air, for 4 hours. After drying some of the resin beads were analyzed for inner core NMP content. This process yielded resin particles containing 14.0% (by weight) of NMP.

EXAMPLE 4

200.0 grams of NMP were added to a 500 ml PYREX® beaker. A 2 inch stirring bar magnet was also added to the beaker. The beaker and contents were placed onto a hot plate/magnetic stirring apparatus. The stirring apparatus control was set at a medium setting. The hot plate was turned on, and the NMP was heated up to 105° C. This temperature was maintained throughout the resin mixing cycle.

To the hot NMP was added 100.0 grams of LURAN® S (SAN resin). Mixing was carried out for 2 hours duration.

In a similar manner as is described in Example 3, spherically shaped beads approximately 0.60 centimeters in diameter were generated. The beads were soaked in water for 20 hours duration, removed from the water and laid out on paper toweling to air dry, in 24° C. air, for 4 hours. Some of the beads were analyzed for inner core NMP content, after being dried. This process yielded resin particles containing 16.2% (by weight) of NMP.

EXAMPLE 5

180.0 grams of N-Hydroxy Ethyl Pyrrolidone (HEP) was added to a 300.0 ml PYREX beaker. A one inch magnetic stirring bar was added to the beaker. The beaker was placed onto a hot plate (magnetic stirring apparatus) and the stirring apparatus was set at a medium speed setting. The heating control was turned on, and the HEP was heated up to 80° C. For the rest of the resin mixing process, the temperature of the contents of the beaker was maintained at 80° C.

20.0 grams of LURAN® S (SAN Resin) was added to the hot HEP and let mix for 8 hours. After the resin was thoroughly mixed into the HEP, an eye dropper was used to titrate the HEP/resin solution into agitated, room temperature water. Upon contact with the water, spherically shaped resin particles were formed. The resin beads were let soak in the water for 20 hours. Each bead's size was approximately 0.60 cm in diameter. The beads were allowed to soak in the water for 20 hours before being removed and dried in 80° C. hot forced air oven for 20 minutes. Some of the dried beads were analyzed for inner core HEP content. This process yielded resin particles containing 2.9% (by weight) of HEP.

METHOD OF USE OF THE CLEANING COMPOUND OF THE PRESENT INVENTION

The most demanding problems, in cleaning extruders or injection molding machines, are associated with removal of residue inside the extruder barrel, either leading to an extruder die head, or in the case of injection molding, into a mold. Both extruder dies and molds are usually cleaned by external means, such as immersing them in a dip tank of liquid metal or mold cleaning compounds. However, liquid metal or liquid mold cleaning compounds cannot be injected into the extruder barrels. Therefore, in order for liquid cleaning compounds to be used for cleaning extruder barrels and screws, the machines must first be taken apart and the screws removed, a time consuming and costly process.

By using the present invention in a manner similar to the process outlined below, it is possible to purge resin and clean out carbon build up, from an extruder, without first disassembling the machine.

A. Empty the extruder of the production resin (the resin last being used). Raise the heat in all zones after the extruder, especially low velocity areas, dead spots and any dies, about 55° C. above production temperature, but do not exceed the safe processing temperature of the production resin. Also, be sure to clean any production resin out of the feed area leading into the extruder.

B. Flush the machine by running a resin, (usually clear high density polyethylene is the acceptable, flush resin of choice) through the extruder. A flush of at least one system volume is required. The amount of the flush will be determined by the size of the extruder one skilled in the art knows that "a system volume" is dependent on the size of the extruder. Run the machine to empty (until all of the flush resin is run out).

C. Heat soak the machine. Adjust temperatures, on all zones of extruder and after the extruder, to 180°–300° C. (Depending on the substituted pyrrolidone that is used as the resin plasticizer, the cleaning temperature will vary). It is important to keep the temperature in a range hot enough to allow for the generation of a large enough quantity of the substituted pyrrolidone, to accomplish the cleaning job, but lower than the auto ignition temperature of the pyrrolidone. i.e., N-methyl pyrrolidone can safely be used within the temperature of 180° C. to 240° C. and N-hydroxy ethyl pyrrolidone can be safely used within the temperature range of 18° C. and 300° C.). Allow machine to run empty, so that the temperatures will "line out", for approximately 15–20 minutes. "Line out" is a term known to those skilled in the art which refers to the time when the machine is allowed to idle while all sections of the extruder come up to the same preset temperature.

D. Load the extruder, in the same manner as for loading production with production resin, with the present invention as described herein. Fill the system until the melted pellets emerge from the die. Maintain the heat at 180°–300° C. The cleaning of the resin residue and carbon deposits will be accomplished by both the scraping action of the resin and the solvent action of the substituted pyrrolidone. In order to free the substituted pyrrolidone away from the resin, the temperature has to be maintained in a range where sufficient amount of substituted pyrrolidone vapors are generated.

E. Soak the system with the screw turning at minimum RPM for about 30 minutes. Keep the barrel full of substituted pyrrolidone plasticized cleaning resin.

F. Purge the system of the substituted pyrrolidone plasticized cleaning resin.

G. Wait 5–10 minutes, after purging substituted pyrrolidone plasticized cleaning resin from the machine, to allow any residual substituted pyrrolidone residue left in the machine to evaporate out.

H. Adjust the heat of the machine to the production resin processing temperature, and begin new production run:

Because the substituted pyrrolidone vapors generated during the cycle, are essential to the cleaning process, when cleaning a vented barrel extruder it is important to remember to cap the vent especially during the soak phase of the cleaning process, so that the vapors are not allowed to escape.

We claim:

1. A method of cleaning plastic processing equipment comprising contacting said equipment with a cleaning compound comprising a hard outer shell made from a thermoplastic resin and a soft inner core comprising a substituted pyrrolidone.

2. A method according to claim 1, wherein said soft inner core comprising a substituted pyrrolidone comprises 2–17% of said cleaning compound.

3. A method according to claim 1, wherein said hard outer shell made from a thermoplastic resin comprises 83–98% of said cleaning compound.

4. A method according to claim 1, wherein said thermoplastic resin is selected from the group consisting of acrylonitrile/butadiene/styrene, styrene/acrylonitrile, polystyrene, acrylonitrile styrene acrylate, methacrylate acrylonitrile butadiene styrene, nylon, polycarbonate, thermoplastic urethane, polyvinylchloride, polyether imide, and polyacetal.

5. A method according to claim 1, wherein said thermoplastic resin is selected from the group consisting of acrylonitrile/butadiene/styrene and styrene/acrylonitrile.

6. A method according to claim 1, wherein said substituted pyrrolidone is selected from the group consisting of N-cyclohexyl pyrrolidone, N-hydroxyethyl pyrrolidone, N-methyl pyrrolidone, and mixtures thereof.

7. A method according to claim 1, wherein said substituted pyrrolidone is N-methyl pyrrolidone.

8. A method according to claim 1, wherein said soft inner core comprising a substituted pyrrolidone comprises 2–17% of said cleaning compound, and wherein said hard outer shell made from a thermoplastic resin comprises 83–98% of said cleaning compound.

9. A method according to claim 1, wherein said cleaning compound has the form of a bead.

10. A method according to claim 1, wherein said cleaning compound has the form of a rod.

11. A method according to claim 1, wherein said cleaning compound has the form of a sheet.

* * * * *